(12) United States Patent
Tabuchi et al.

(10) Patent No.: US 7,768,734 B2
(45) Date of Patent: Aug. 3, 2010

(54) STORAGE DEVICE AND METHOD OF CONTROLLING SPINDLE MOTOR OF STORAGE DEVICE

(75) Inventors: Tetsuya Tabuchi, Kawasaki (JP);
Mitsuo Kamimura, Kawasaki (JP);
Fumiya Kudo, Kawasaki (JP);
Shigenori Yanagi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/240,723

(22) Filed: Sep. 29, 2008

(65) Prior Publication Data

US 2009/0195910 A1 Aug. 6, 2009

(30) Foreign Application Priority Data

Feb. 6, 2008 (JP) .............................. 2008-026950

(51) Int. Cl.
*G11B 15/18* (2006.01)
*G11B 21/02* (2006.01)

(52) U.S. Cl. .......................................... 360/69; 360/75

(58) Field of Classification Search ....................... None
See application file for complete search history.

(56) References Cited

U.S. PATENT DOCUMENTS 5,204,593 A * 4/1993 Ueki ....................... 318/400.3
5,530,326 A * 6/1996 Galvin et al. .......... 318/400.11
5,835,310 A * 11/1998 Battu et al. .............. 360/264.7
6,218,795 B1 * 4/2001 Syukuri ................. 318/400.17
6,476,994 B2 * 11/2002 Koizumi et al. ............... 360/69
7,253,581 B2 * 8/2007 Koide et al. ............ 318/400.12
2005/0179410 A1 8/2005 Jeong et al.
2008/0037164 A1 2/2008 Oh et al.

FOREIGN PATENT DOCUMENTS

| EP | 1 564 737 | 8/2005 |
|---|---|---|
| JP | A 2005-237195 | 9/2005 |
| KR | 10-2005-0082089 | 8/2005 |
| KR | 10-0652441 | 11/2006 |

OTHER PUBLICATIONS

Adtron Product Specification Oct. 2003 for 3.5" SCSI Disk Drive -S35H.*

* cited by examiner

*Primary Examiner*—K. Wong
(74) *Attorney, Agent, or Firm*—Greer, Burns & Crain, Ltd.

(57) ABSTRACT

In a storage device, before activating a spindle motor (SPM) or continuously from activation until the SPM is stabilized at a target number of rotations, a voltage and temperature monitoring unit monitors the temperature in a disk enclosure unit and the voltage to be applied to an SPM driver. A current limit value calculating unit calculates an optimum current limit value not exceeding a rated current of the SPM driver, and a motor controlling unit controls the SPM driver and changes the current to be applied to the SPM so that the current does not exceed this optimum current limit value.

12 Claims, 6 Drawing Sheets

| PHASE | CURRENT APPLYING DIRECTION | DESIGNATED CURRENT AMOUNT VALUE [mA] | APPLICATION TIME [ms] |
|---|---|---|---|
| FIRST PHASE | (1) | 600 | 12.5 |
| FIRST PHASE | (2) | 600 | 6.3 |
| SECOND PHASE | (3) | 600 | 4.8 |
| SECOND PHASE | (4) | 600 | 3.8 |
| THIRD PHASE | (5) | 600 | 1.5 |
| THIRD PHASE | (6) | 600 | 0.05 |

STORAGE DEVICE AND METHOD OF CONTROLLING SPINDLE MOTOR OF STORAGE DEVICE

BACKGROUND OF THE INVENTION

1. Field of the Invention

The present invention relates to a storage device which positions a head at a target location on a storage medium, and a method of controlling a spindle motor of the storage device.

2. Description of the Related Art

A computer device has incorporated therein or connected thereto a storage device, such as a magnetic disk device, that has incorporated therein a disk-like storage medium and reads and writes information therefrom and thereto. In such a storage device, with the rotation of the storage medium by a spindle motor (SPM) and sliding of an actuator having a head mounted thereon by a voice coil motor (VCM) for reading and writing information from and to the storage medium, the head is positioned at a target location on the storage medium.

Here, to position the head at the target location to read and write information from and to the storage medium, the number of rotations of the storage medium has to reach a steady state. However, in relation to the moment of inertia of the storage medium and the driving force of the SPM according to the current amount to be applied to the SPM, it may take some time for the number of rotations of the storage medium to reach the steady state after the storage device is powered up, making it impossible to quickly activate the storage device and also impossible to quickly position the head at the target location on the storage medium.

To get around this problem, in an SPM control method as disclosed in Japanese Patent Application Laid-open Publication No. 2005-237195, the power supply voltage value supplied to the SPM is measured and, according to the measured power supply voltage, a maximum current value that can be supplied to the SPM within maximum allowable power of the storage device. With an SPM activating current corresponding to this calculated maximum current value being applied to the SPM, the SPM can be activated more quickly.

However, the conventional technologies typified by the one disclosed in Japanese Patent Application Laid-open Publication No. 2005-237195 have the following problems. That is, since power is represented by the product of a resistance value and a current amount, if the resistance value is constant, the maximum allowable power of the storage device is directly proportional to the square of the current amount that can be allowed to be applied to the storage device. Conversely, if the maximum allowable power is set as being constant, the current that can be allowed to be applied to the storage device is determined accordingly.

Here, the maximum allowable power of the storage device is required to be set most conservatively so as to prevent a failure of the storage device. Therefore, to minimize the maximum allowable power of the storage device within the range of an assumed environment where the storage device is used, the current amount that can be allowed to be applied to the storage device is required to be minimized.

If the power supply voltage supplied to the storage device is constant, with small maximum allowable power, the current amount that can be applied to the storage device, particularly the SPM, has to be decreased. If the current amount that can be applied to the SPM is small, the time from the start of the rotation of the SPM until the rotation reaches the steady state is increased, also making it impossible to quickly activate the storage device and also impossible to quickly position the head at the target location on the storage medium.

SUMMARY

It is an object of the present invention to at least partially solve the problems in the conventional technology.

According to an aspect of the present invention, a storage device is connected to a computer device as an external storage device, and includes a spindle motor that rotates a storage medium according to a current amount to be applied; and a head positioned at a target location on the storage medium by the rotation of the storage medium. The storage device also includes a temperature measuring unit that measures a temperature in the storage device; a power-supply-voltage measuring unit that measures a power supply voltage supplied to the spindle motor; a current-amount limiting value calculating unit that calculates a current-amount limiting value for limiting the current amount to be applied to the spindle motor based on the temperature measured by the temperature measuring unit and the power supply voltage measured by the power-supply-voltage measuring unit; and an applied-current-amount controlling unit that controls the current amount to be applied to the spindle motor so that the current amount does not exceed the current-amount limiting value calculated by the current-amount limiting value calculating unit.

According to another aspect of the present invention, a storage device includes a disk-like storage medium having a diameter of 3.5 inches; a spindle motor that rotates the storage medium; and an actuator that drives a head that reads and writes information from and to the storage medium. The spindle motor and the actuator are supplied with a power supply voltage of 5 volts from a single power supply.

According to still another aspect of the present invention, a method is for controlling a storage device connected to a computer device as an external storage device. The storage device includes a spindle motor that rotates a storage medium according to a current amount to be applied, and a head positioned at a target location on the storage medium by the rotation of the storage medium. The method includes measuring a temperature in the storage device; measuring a power supply voltage supplied to the spindle motor; calculating a current-amount limiting value for limiting the current amount to be applied to the spindle motor based on the measured temperature and the measured power supply voltage; and controlling the current amount to be applied to the spindle motor so that the current amount does not exceed the current-amount limiting value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

With reference to the attached drawings, embodiments of a storage device and a method of controlling a spindle motor of the storage device according to the present invention are explained in detail below. Here, in the following embodiments, it is assumed that the storage medium is a magnetic disk, whilst the storage device is a magnetic disk device. As the storage device, a magnetic disk device incorporated in or connected externally to a computer device as an external storage device is explained. However, this is not meant to be restrictive, and the present invention can be generally applied to any storage device in which a storage medium is rotated by the rotation of a spindle motor rotating according to the current amount to be applied to cause a head to be positioned at a target location on the storage medium.

Here, in the following embodiments, supplying a current to a load circuit, such as a Micro Controller Unit (MCU) or an integrated circuit, is referred to as application of a current. Also, applying a voltage to such a load circuit is referred to as application of a voltage. Also, in the following embodiments, unless otherwise specified, temperature is represented in degrees Celsius, the voltage is represented in volts, current (current amount) is represented in milliamperes or amperes, power is represented in watts, torque is represented in N·m, a torque constant is represented in N·m/A, and moment of inertia is represented in Kg·m².

Figure 1:
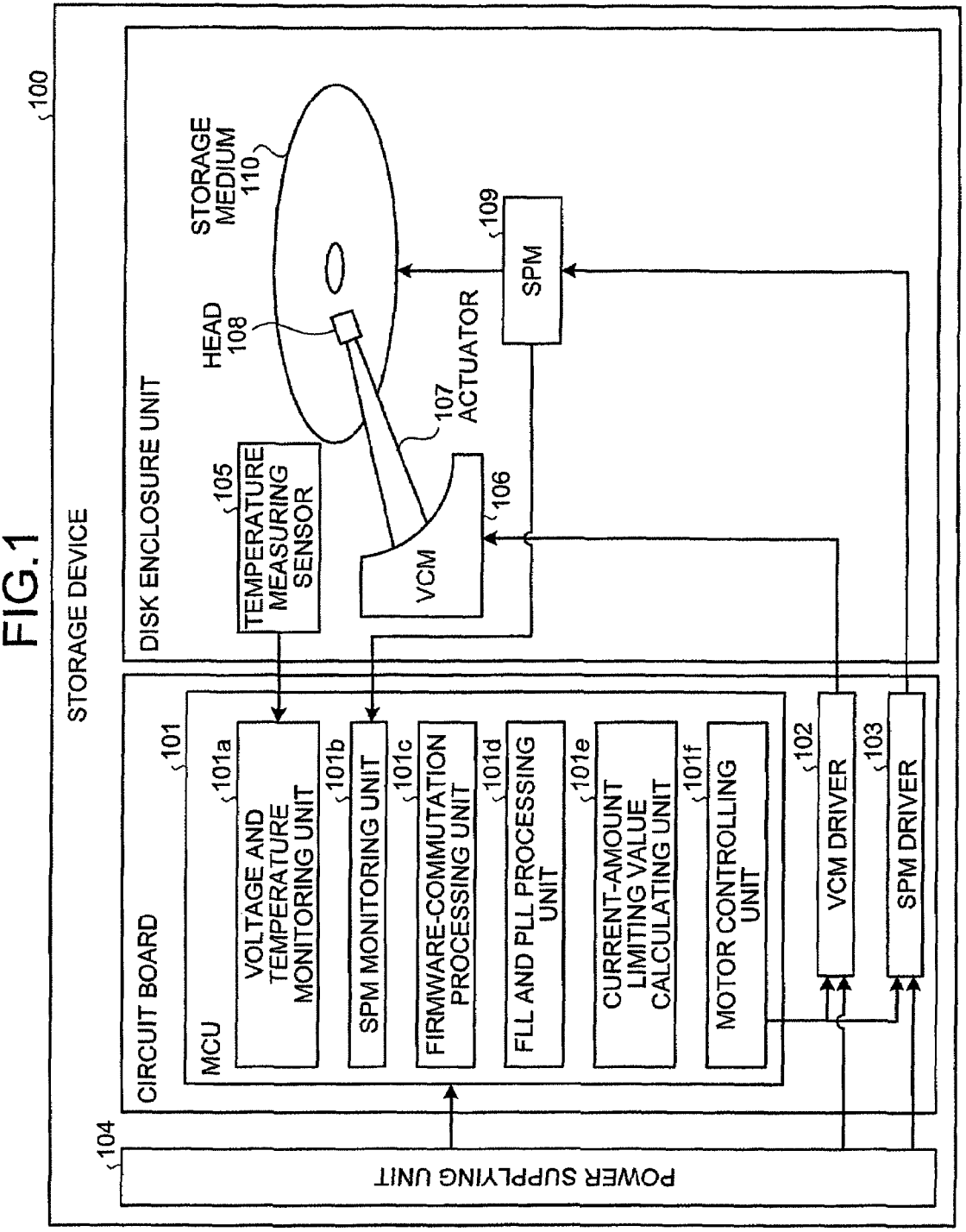
FIG. 1 is a block diagram of the configuration of a storage device according to a first embodiment.

First, the configuration of a storage device according to a first embodiment is explained. FIG. 1 is a block diagram of the configuration of the storage device according to the first embodiment. As depicted in the drawing, a storage device 100 according to the first embodiment includes on a circuit board a MCU 101, a VCM driver 102, and an SPM driver 103. Also, the storage device 100 includes a power supplying unit 104. Furthermore, the storage device 100 has a disk enclosure unit that includes a temperature measuring sensor 105, a VCM for rocking an actuator 107, a head 108 mounted on the tip of the actuator 107, and an SPM 109 that rotates a disk-like storage medium 110 with a rotating shaft attached to the center of the storage medium 110.

Here, the power supplying unit 104 is a single power supply, supplying a voltage of 5 volts to the MCU 101, the VCM driver 102, and the SPM driver 103.

Also, the storage device 100 includes an Hard Disk Controller (HDC) that generates and adds Error Correcting Code (ECC) to a write data signal coming from the computer device to which the storage device 100 is connected for writing to the storage medium via the head 108, a write channel for modulation and recording-compensation of the write data signal input from the HDC, and a write amplifier that amplifies the data signal input from the write channel for output to the head 108 for writing to the storage medium 110. However, in the first embodiment, explanation and depiction of these are omitted.

Similarly, the storage device 100 includes a preamplifier that amplifies a read data signal read from the storage medium via the head 108, a read channel for waveform equalization, Viterbi decoding, and demodulation of the read data signal input from the preamplifier, and an HDC that performs an ECC error correction on the read data signal input from the read channel for output to the computer device to which the storage device 100 is connected. However, in the first embodiment, explanation and depiction of these are omitted.

The MCU 101 is a control device that controls the VCM driver 102 and the SPM driver 103. The MCU 101 includes a voltage and temperature monitoring unit 101a, an SPM monitoring unit 101b, a firmware commutation processing unit 101c, a Frequency Locked Loop (FLL) and Phase Locked Loop (PLL) processing unit 101d, and a current-amount limiting value calculating unit 101e.

The voltage and temperature monitoring unit 101a monitors the voltage to be applied from the power supplying unit 104 to the MCU 101, the VCM driver 102, and the SPM driver 103, and also monitors the temperature in the disk enclosure unit detected by the temperature measuring sensor 105.

Also, the voltage and temperature monitoring unit 101a stops activation of the storage device 100 when the temperature in the disk enclosure unit detected by the temperature measuring sensor 105 is not within an operation-guaranteed range of the storage device 100.

Figures 2, 3:
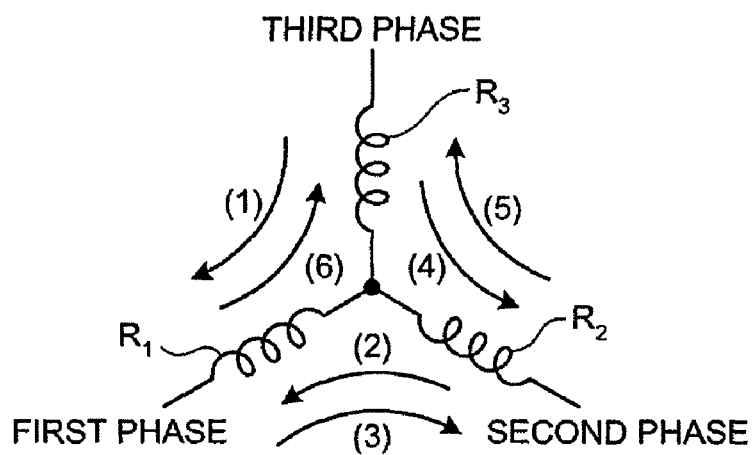
FIG. 2 is a drawing of one example of a firmware-commutation setting table according to the first embodiment.
FIG. 3 is a drawing of one example of a firmware-commutation order in a spindle motor according to the first embodiment.

The SPM monitoring unit 101b monitors the conditions of the rotation of the SPM 109, specifically, whether the SPM 109 is being rotated, and if so, whether the rotation is in a steady state. The firmware commutation processing unit 101c outputs a designated current amount value to the VCM driver 102 through a firmware commutation process. Also, the firmware commutation processing unit 101c stores a firmware-commutation setting table, an example of which is depicted in FIG. 2. Furthermore, the firmware commutation processing unit 101c stores a reference temperature $T_a$, which will be explained further below.

Here, the firmware commutation processing unit 101c calculates a designated current amount value to be output to the VCM driver 102 in a firmware commutation process based on the latest temperature in the disk enclosure unit detected by the temperature measuring sensor 105 and monitored by the voltage and temperature monitoring unit 101a and a reference designated current amount value $I_a$ stored in the firmware-commutation setting table.

That is, when it is assumed that $A_0$ is a positive constant, $T_s$ is the latest temperature in the disk enclosure unit, $T_a$ is the reference temperature, and $I_a$ is the designated current amount value stored in the firmware-commutation setting table, a designated current amount value $I_{desig}$ is calculated based on the following equation:

$$I_{desig} = A_0 \cdot (T_s - T_a) \cdot I_a \tag{1}$$

where $T_s > T_a$.

Alternatively, the designated current amount value $I_{desig}$ may be calculated based on the following equation where $A_1$ is a positive constant, $T_s$ is the latest temperature in the disk enclosure unit, $T_a$ is the reference temperature, and $I_a$ is the designated current amount value stored in the firmware-commutation setting table:

$$I_{desig} = I_a + A_1 \cdot (T_s - T_a) \tag{2}$$

Still alternatively, the designated current amount value $I_{desig}$ may be calculated based on the following equation where $A_2$ is a positive constant, $T_s$ is the latest temperature in the disk enclosure unit, $T_a$ is the reference temperature, and $I_a$ is the designated current amount value stored in the firmware-commutation setting table:

$$I_{desig} = A_2 \cdot \frac{T_s}{T_a} \cdot I_a \tag{3}$$

Accordingly, the firmware commutation processing unit 101c refers to the firmware-commutation setting table, an example of which is depicted in FIG. 2, to sequentially read a designated current amount value and an application time in order of a first phase, a second phase, and a third phase in order of a current applying direction (1) to (6). With the read designated current amount value taken as $T_s$, the firmware commutation processing unit 101c calculates a designated current amount value $I_{desig}$ based on any one of Equations (1) to (3), and then outputs the calculated designated current amount value $I_{desig}$ to a motor controlling unit 101f.

Then, the firmware commutation processing unit 101c repeats the process of reading, one row at a time, the corresponding designated current amount value and application time in order of the current applying directions (1) to (6) to calculate the designated current amount value $I_{desig}$ and application time for output to the motor controlling unit 101f up to the row of the current applying direction (6).

With the firmware commutation process, when the SPM 109 is a three-phase motor, an example of which is depicted in FIG. 3, for example, the designated current amount value $I_{desig}$ calculated based on any one of Equations (1) to (3) above is provided to the SPM driver 103 through the motor controlling unit 101f, with the phase and the current application direction of the SPM 109 being changed from a first phase with a resistance of $R_1$ (the current applying direction (1) and then the current applying direction (2) depicted in FIG. 3), a second phase with a resistance of $R_1$ (the current applying direction (3) and then the current applying direction (4) depicted in FIG. 3), and then a third phase with a resistance of $R_3$ (the current applying direction (5) and then the current applying direction (6) depicted in FIG. 3). Then, the current corresponding to the designated current amount value $I_{desig}$ is applied to the SPM 109. With this, the rotation of the SPM 109 can be started.

With the current corresponding to the designated current amount value $I_{desig}$ calculated based on any one of Equations (1) to (3) above being applied to the SPM 109, depending on the latest temperature $T_s$ in the disk enclosure unit, a current larger than the reference designated current amount value $I_a$ stored in the firmware-commutation setting table. Thus, it is possible to more quickly start the rotation of the SPM 109.

The FLL and PLL processing unit 101d synchronizes the frequency and phase of the rotation of the SPM 109 to predetermined frequency and phase. The current-amount limiting value calculating unit 101e calculates a current-amount limiting value to be output to the VCM driver 102 based on the latest temperature in the disk enclosure unit detected by the temperature measuring sensor 105 and monitored by the voltage and temperature monitoring unit 101a or the voltage to be applied by the power supplying unit 104. Also, the current-amount limiting value calculating unit 101e stores a reference temperature $T_b$ (or a reference voltage $V_b$) and a reference current-amount limiting value $I_b$, and all of these values will be explained further below.

That is, when it is assumed that $B_0$ is a positive constant, $T_s$ is the latest temperature in the disk enclosure unit, $T_b$ is the reference temperature, and $I_b$ is the reference current-amount limiting value, a current-amount limiting value $I_{dist}$ is calculated based on the following equation:

$$I_{dist}=B_0 \cdot (T_s-T_b) \cdot I_b \qquad (4)$$

where $T_s > T_b$.

Alternatively, the current-amount limiting value $I_{dist}$ may be calculated based on the following equation where $B_1$ is a positive constant, $T_s$ is the latest temperature in the disk enclosure unit, $T_b$ is the reference temperature, and $I_b$ is the reference current-amount limiting value:

$$I_{dist}=I_b+B_1 \cdot (T_s-T_b) \qquad (5)$$

Still alternatively, the current-amount limiting value $I_{dist}$ may be calculated based on the following equation where $B_2$ is a positive constant, $T_s$ is the latest temperature in the disk enclosure unit, $T_b$ is the reference temperature, and $I_b$ is the reference current-amount limiting value:

$$I_{dist} = B_2 \cdot \frac{T_s}{T_b} \cdot I_b \qquad (6)$$

Still alternatively, the current-amount limiting value $I_{dist}$ may be calculated based on the following equation where $C_0$ is a positive constant, $V_s$ is the latest voltage to be applied by the power supplying unit 104, $V_b$ is the reference voltage, and $I_b$ is the reference current-amount limiting value:

$$I_{dist}=C_0 \cdot (V_s-V_b) \cdot I_b \qquad (7)$$

where $T_s > T_b$.

Still alternatively, the current-amount limiting value $I_{dist}$ may be calculated based on the following equation where $C_1$ is a positive constant, $V_s$ is the latest voltage to be applied by the power supplying unit 104, $V_b$ is the reference voltage, and $I_b$ is the reference current-amount limiting value:

$$I_{dist}=I_b+C_1 \cdot (V_s-V_b) \qquad (8)$$

Still alternatively, the current-amount limiting value $I_{dist}$ may be calculated based on the following equation where $C_2$ is a positive constant, $V_s$ is the latest voltage to be applied by the power supplying unit 104, $V_b$ is the reference voltage, and $I_b$ is the reference current-amount limiting value:

$$I_{dist} = I_b + C_2 \cdot \frac{V_s}{V_b} \cdot I_b \qquad (9)$$

Then, the current-amount limiting value calculating unit 101e outputs the current-amount limiting value $I_{dist}$ calculated based on any one of Equations (4) to (9) above to the motor controlling unit 101f. The motor controlling unit 101f receiving the input of the current-amount limiting value $I_{dist}$ controls the VCM 106 and the SPM 109 for velocity control of the VCM 106 and the SPM 109.

Also, the motor controlling unit 101f receiving the input of the current-amount limiting value $I_{dist}$ outputs the designated current amount value $I_{desig}$ calculated by the firmware commutation processing unit 101c and the corresponding application time to the VCM driver 102. Furthermore, the motor controlling unit 101f stores the current-amount limiting value $I_{dist}$ calculated by the current-amount limiting value calculating unit 101e and outputs it to the SPM driver 103.

The VCM driver 102 applies a current to the VCM 106. Also, the SPM driver 103 applies a current to the SPM 109, while controlling so that the current does not exceed the current amount corresponding to the current-amount limiting value $I_{dist}$. Here, the VCM driver 102 and the SPM driver 103 are generally implemented on a one-chip integrated circuit.

With a maximum current not exceeding the current-amount limiting value $I_{dist}$ calculated based on any of Equations (4) to (9) being applied to the SPM 109, depending on the latest temperature $T_s$ in the disk enclosure unit (or the latest voltage $V_s$), a current larger than the reference current-amount limiting value $I_b$ can be applied to the SPM 109. Thus, the rotation of the SPM 109 can be more quickly accelerated.

Figure 4:
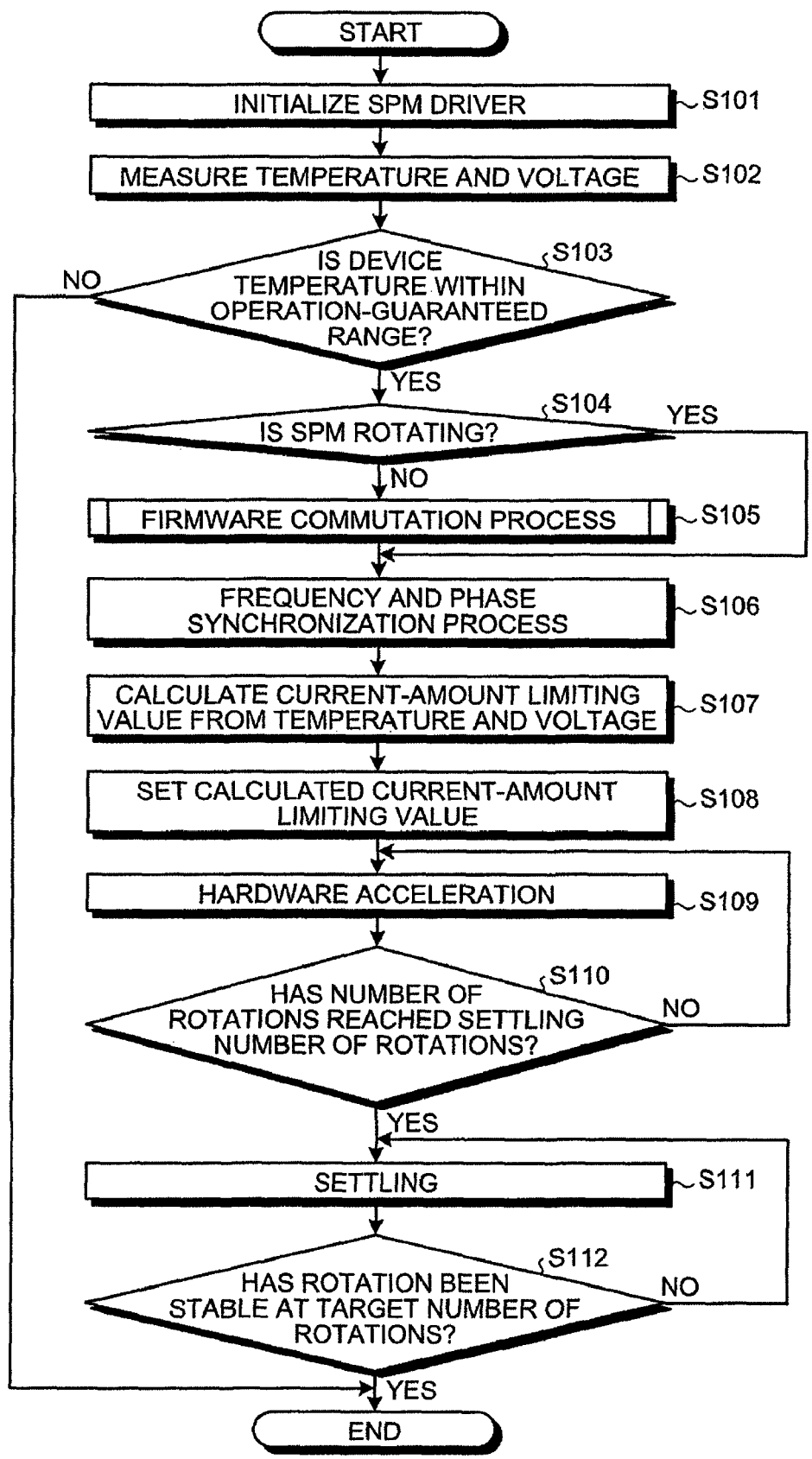
FIG. 4 is a flowchart of a spindle-motor activating procedure according to the first embodiment.

Next, a spindle-motor activating process according to the first embodiment is explained. FIG. 4 is a flowchart of a spindle-motor activating procedure according to the first embodiment. First, as depicted in the drawing, the motor controlling unit 101f initializes the SPM driver 103 (Step S101).

Then, the voltage and temperature monitoring unit 101a measures the latest voltage to be applied by the power supplying unit 104 to the MCU 101, the VCM driver 102, and the SPM driver 103 and the latest temperature in the disk enclosure unit of the storage device 100 (Step S102).

Then, the voltage and temperature monitoring unit 101a determines whether the latest temperature in the disk enclosure unit of the storage device 100 is within the operation-guaranteed range of the storage device 100 (Step S103). If it is determined that the latest temperature in the disk enclosure unit of the storage device 100 is within the operation-guaranteed range of the storage device 100 (Yes at Step S103), the procedure goes to step S104. If it is not determined that the latest temperature in the disk enclosure unit of the storage device 100 is within the operation-guaranteed range of the storage device 100 (No at Step S103), the spindle-motor activating process ends.

Then, the SPM monitoring unit 101b determines whether the SPM 109 is rotating (Step S104). If it is determined that the SPM 109 is rotating (Yes at Step S104), the procedure goes to step S106. If it is not determined that the SPM 109 is rotating (No at Step S104), the procedure goes to step S105.

Figure 5:
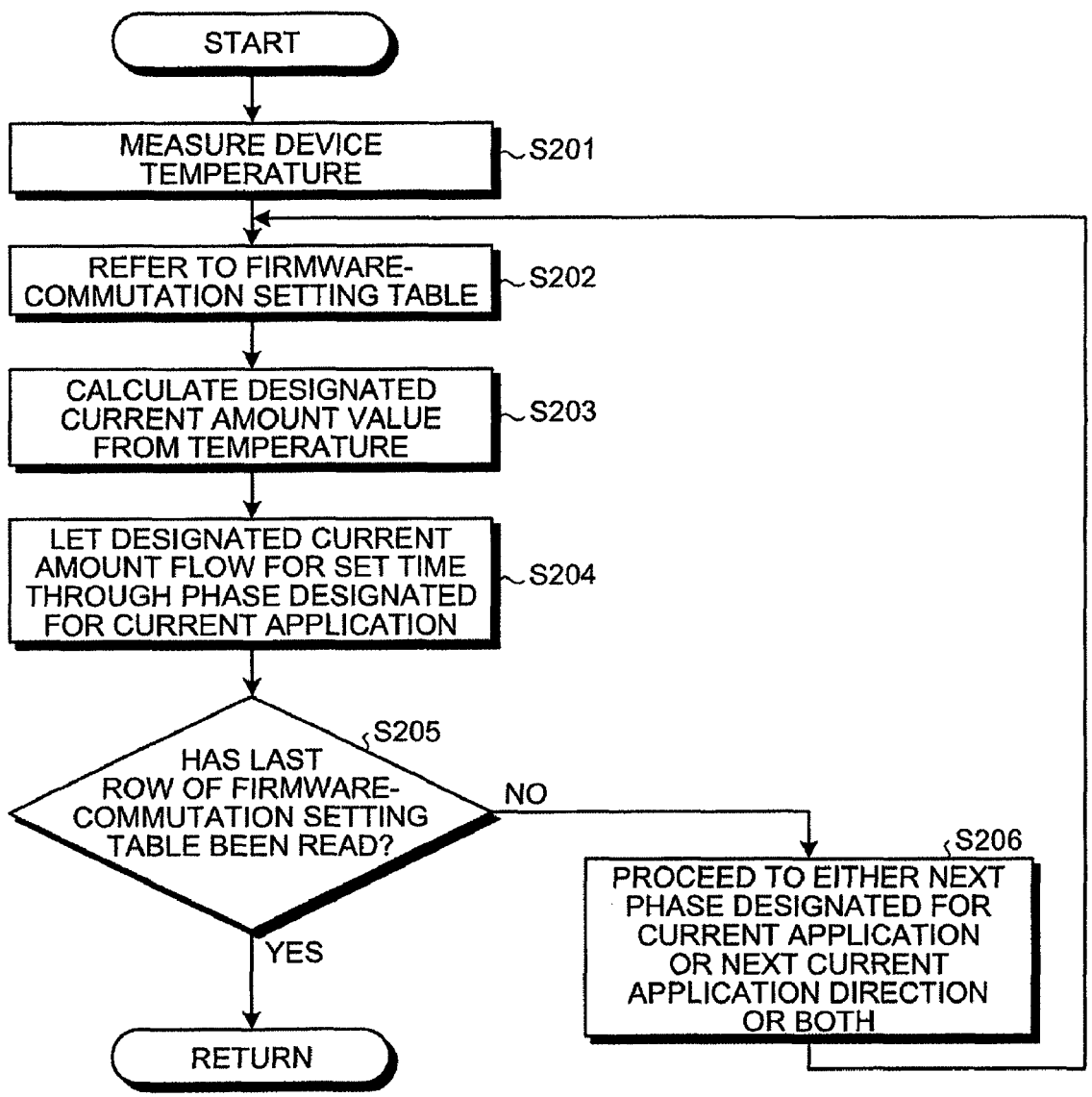
FIG. 5 is a flowchart of a firmware-commutation procedure according to the first embodiment.

At step S105, the firmware commutation processing unit 101c performs a firmware commutation process, which will be explained further below with reference to FIG. 5. Then, the FLL and PLL processing unit 101d synchronizes the frequency and the phase of the rotation of the SPM 109 to a predetermined frequency and a predetermined phase (Step S106).

Then, the current-amount limiting value calculating unit 101e calculates a current-amount limiting value based on the latest temperature and the latest voltage measured at step S102 (Step S107). Then, the current-amount limiting value calculating unit 101e sets the current-amount limiting value calculated at step S107 to the motor controlling unit 101f (Step S108).

Then, the SPM driver 103 gradually increases the current amount so that the current amount does not exceed the current-amount limiting value set in the motor controlling unit 101f for application to the SPM 109 over a predetermined period, thereby accelerating the rotation of the storage medium 110 (hardware acceleration, Step S109).

Then, the SPM monitoring unit 101b determines whether the number of rotations of the SPM 109 has reached a settling number of rotations, which is a stable number of rotations (Step S110). If it is determined that the number of rotations of the SPM 109 has reached a settling number of rotations, which is a stable number of rotations (Yes at Step S110), the procedure goes to step S111. If it is not determined that the number of rotations of the SPM 109 has reached a settling number of rotations, which is a stable number of rotations (No at Step S110), the procedure goes to step S109.

At step S111, the motor controlling unit 101f performs settling (waiting for the rotation to become stable) by applying a predetermined current amount to the SPM 109. Then, the SPM monitoring unit 101b determines whether the rotation of the SPM 109 has been stable at a target number of rotations (Step S112). If it is determined that the rotation of the SPM 109 has been stable at a target number of rotations (Yes at Step S112), the spindle-motor activating process ends. If it is not determined that the rotation of the SPM 109 has been stable at a target number of rotations (No at Step S112), the procedure goes to step S111.

Next, the firmware commutation process at step S105 of FIG. 4 is explained. FIG. 5 is a flowchart of a firmware-commutation procedure according to the first embodiment. First, as depicted in the drawing, the voltage and temperature monitoring unit 101a measures the latest temperature of the device (Step S201).

Then, the firmware commutation processing unit 101c refers to the firmware-commutation setting table to read the rows in the firmware-commutation setting table, one row at a time, sequentially from the start (Step S202).

Then, the firmware commutation processing unit 101c calculates the designated current amount value based on the designated current amount value stored in the row of the firmware-commutation setting table read at step S202 and the latest temperature in the disk enclosure unit of the storage device 100 (Step S203).

Then, the firmware commutation processing unit 101c instructs the SPM driver 103 via the motor controlling unit 101f to apply a current amount corresponding to the designated current amount value calculated at step S203 to the phase to which current application by the SPM 109 is directed, over the application time stored in the firmware-commutation setting table (Step S204).

Then, the firmware commutation processing unit 101c determines whether the last row of the firmware-commutation setting table has been read at step S202 (Step S205). If it is determined that the last row of the firmware-commutation setting table has been read at step S202 (Yes at Step S205), the procedure returns to step S106 (FIG. 4) of the spindle-motor activating process. If it is not determined that the last row of the firmware-commutation setting table has been read at step S202 (No at Step S205), the procedure goes to step S206.

At step S206, the firmware commutation processing unit 101c proceeds to either the next phase designated for current application or the next current applying direction or both in the firmware commutation setting table. After this process ends, the procedure returns to step S202.

Figure 6:
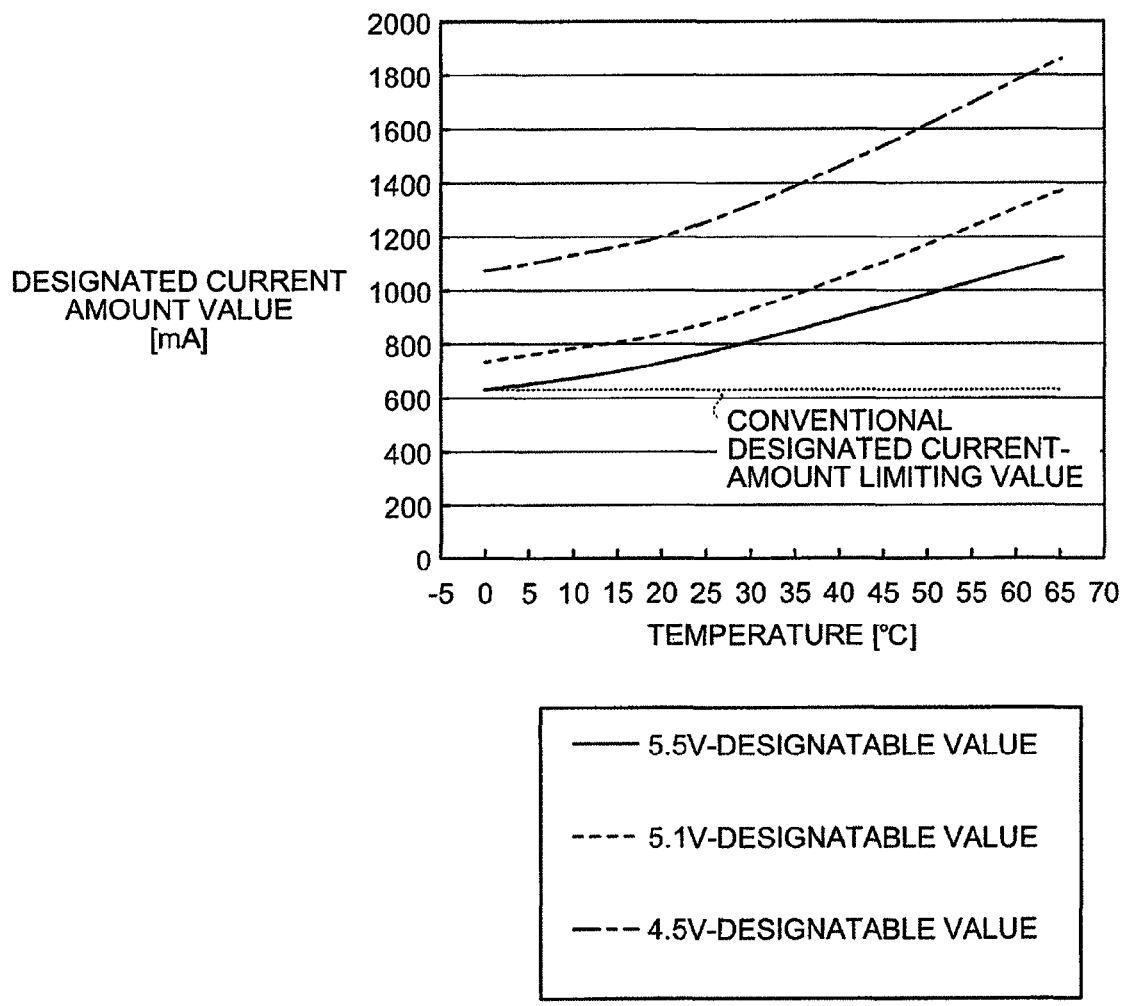
FIG. 6 is a drawing of one example of temperature-voltage characteristics of the spindle motor according to the first embodiment.

Next, temperature-voltage characteristics of the spindle motor according to the first embodiment are explained. FIG. 6 is a drawing of one example of temperature-voltage characteristics of the spindle motor according to the first embodiment. Here, in each curve in the drawing, a designatable value indicates a maximum current amount for each temperature and voltage allowed for application to the SPM 109 and the SPM driver 103 (that is, a designated current amount varying according to temperature).

Conventionally, as depicted in the drawing, in the case of the SPM 109 and the SPM driver 103 with the temperature in the device and having the maximum current characteristics, for example, it is assumed that the operation-guaranteed temperature and voltage are set at 0 degrees Celsius to 65 degrees Celsius and 4.5 volts to 5.5 volts, respectively. Of these conditions, a voltage that causes a peak current of the SPM driver 103 at a low temperature decreasing the coil resistance of the SPM 109 is 5.5 volts at 0 degrees Celsius.

In the conventional technology, a current-amount limiting value satisfying the rating of the SPM driver 103 under the condition of 5.5 volts at 0 degrees Celsius is applied to all temperatures. For this reason, under a low voltage at a high temperature, the current-amount limitation is excessive, thereby delaying the activation time of the SPM 109.

By contrast, in the first embodiment, the current-amount limiting value is found by using any one of Equations (4) to (9) above. Therefore, unlike the conventional technology, the current-amount limitation is not excessive, and the SPM 109 can be activated more quickly by following the temperature in the disk enclosure unit of the storage device 100, the voltage to be applied to the SPM driver 103, a change in coil resistance of the SPM 109 due to a temperature change, a change in acceleration constant (torque constant) of the SPM 109, or the like. Also, a success rate of activation can be increased.

Here, in the first embodiment, the SPM 109 is assumed to be driven at 5 volts, for example. With this, a data recording and replaying performance equivalent to, for example, a data recording and replaying performance in the case of driving at 12 volts, which is larger than 5 volts, can be achieved. Also, a magnetic disk device of a 3.5-inch magnetic disk can be operated with a single power supply of 5 volts. Therefore, the power supply of the magnetic disk device can be standardized as 5 volts, thereby simplifying the device configuration.

For example, a conventional magnetic device for 3.5-inch magnetic disks operates by being driven with a single power supply of 12 volts or being driven with combined power supplies of 5 volts and 12 volts. However, such a conventional magnetic device for 3.5-inch magnetic disks has four 3.5-inch magnetic disk incorporated therein, and the moment of inertia of these four magnetic disk is approximately $1.6 \times 10^{-4}$ Kg·m$^2$; the torque constant of a standard spindle motor is $10 \times 10^{-3}$ N·m/A; and the coil resistance of the standard spindle motor is 2.5 ohms. Thus, for the rotation of the spindle motor to reach 7200 revolutions per minutes within six seconds, even in the case of not considering a back-electromotive force, the starting current can be approximately 2 amperes.

Here, since the motor driving capability of the spindle-motor control IC (SPM driver 103) driven at 5 volts is 5 volts/2.5 ohms=2 amperes, four magnetic disks can be rotated. However, in consideration of occurrence of a back-electromotive force, there is no margin for this. Moreover, the maximum rating of the spindle-motor control IC driven at 5 volts is approximately 1.5 amperes, exceeding the maximum rating.

To get around this, in response to an increase in temperature due to an increase in coil resistance of the spindle motor from 2.5 amperes according to an increase in temperature in the disk enclosure unit by a predetermined amount, the limiting value of the starting current to be applied to the spindle motor is increased within an allowable range of the maximum rating of the spindle-motor control IC. Then, a maximum current not exceeding the increased limiting value of the starting current is applied to the spindle motor. With this, a maximum power amount can be obtained within the range of the maximum rating of the spindle-motor control IC driven at 5 volts.

Also, when the current to be applied to the spindle motor is changed according to an increase in coil resistance of the spindle motor according to an increase in temperature in the disk enclosure unit of the magnetic disc device, if the activation speed of the magnetic disk can be equal to the speed of the conventional magnetic disk device, in view of the power to be supplied to the spindle motor, the current amount to be applied can be reduced by an increase in coil resistance of the spindle motor. With this, power consumption of the magnetic disk device can be reduced. Also, it is possible to downsize the power supply of the magnetic disk device and to achieve unification of power supplies into one, thereby reducing the system load.

Furthermore, when an increase in coil resistance of the spindle motor according to an increase in temperature in the disk enclosure unit of the magnetic disk device is equal to or larger than a predetermined value, the activation speed of the magnetic disk can be increased more than that in the conventional magnetic disk device, and also the current amount to be applied to the spindle motor can be reduced.

Still further, also by using a spindle motor with a low coil resistance and a high torque, reducing the number of disks from four to three, and decreasing the target number of rotations, it is possible to drive the magnetic disk with a single power supply at 5 volts.

Specifically, when it is assumed that the number of magnetic disks is reduced to three; the moment of inertia of these three magnetic disks is $1.2 \times 10^{-4}$ Kg·m$^2$; the torque constant of the spindle motor is $6 \times 10^{-3}$ N·m/A; and the coil resistance is 1.25 ohms, for the spindle motor to reach to 3600 revolutions per minute within six seconds, in the case of not considering a back-electromotive force, the starting current can be approximately 1.26 amperes. The driving capability of the spindle-motor control IC driven at 5 volts becomes 5 volts/1.25 ohms=approximately 4 amperes to cause a margin. Furthermore, the maximum rated current of 1.5 amperes can also be satisfied.

By using a spindle motor with a low coil resistance and a high torque, reducing the number of disks from four to three, and decreasing the target number of rotations, it is possible to, for example, reduce power consumption at the time of performance idling of the conventional magnetic disk device. Also, it is possible to downsize the power supply of the magnetic disk device and to achieve unification of power supplies into one, thereby reducing the system load.

The first embodiment can be summarized as follows. That is, conventionally, in a firmware commutation process, a constant value is used for the designated current amount to be applied to the SPM 109 irrespectively of the temperature in the disk enclosure unit of the storage device 100 or the voltage to be applied to the SPM driver 103. For this reason, a change in resistance value of the coil of the SPM 109 due to a temperature change, variations in acceleration constant, and variations in rated current of the SPM driver 103 cannot be addressed, and whether the firmware commutation process is successfully performed largely depends on temperature and individual difference of the SPM driver 103.

To get around this problem, in the first embodiment, the designated current amount value at the time of the firmware commutation process is corrected in the following manner to improve a successful ratio of the firmware commutation process. That is, a change in current effective value is measured in advance for each temperature, and any one or all of a temperature change coefficient $A_0$ (appearing in Equation (1) above), a temperature change coefficient $A_1$ (appearing in Equation (2) above), and a temperature change coefficient $A_2$ (appearing in Equation (3) above) is (are) found in advance for an optimum designated current amount value.

Then, before the firmware commutation process, the temperature in the disk enclosure unit of the storage device 100 is measured. According to this measurement result, within an operation-guaranteed temperature range, an optimum designated current amount value not exceeding the rated current of the SPM driver 103 is calculated to change the designated current to be applied to the SPM 109.

Also, conventionally, a constant value is used for the current-amount limiting value irrespectively of the temperature in the disk enclosure unit of the storage device 100 or the voltage to be applied to the SPM driver 103. Also, to use the constant current-limiting value in a temperature and voltage environment where the operations of the SPM driver 103 and the SPM 109 are guaranteed, a value in consideration of worst conditions has to be set. For this reason, depending on any one of temperature and applied-voltage conditions or both, the current to be applied to the SPM 109 is excessively restricted, which may lead to a delay of the activation time of the storage device 100.

To get around this problem, the current-amount limiting value is correct in the following manner to improve the activation time of the storage device 100. That is, a current value satisfying the rating of the SPM driver 103 is measured in advance for each temperature or each voltage or both.

First, any one or all of a change constant $B_0$ (appearing in Equation (4) above), a change constant $B_1$ (appearing in Equation (5) above), and a change constant $B_2$ (appearing in Equation (6) above) of the current-amount limiting value due to temperature are found in advance. Alternatively, any one or all of a change constant $C_0$ (appearing in Equation (7) above), a change constant $C_1$ (appearing in Equation (8) above), and a change constant $C_2$ (appearing in Equation (9) above) of the current-amount limiting value due to voltage are found in advance.

Then, before the SPM 109 is activated or continuously until the SPM 109 is stabilized at the target number of rotations, the temperature in the disk enclosure unit of the storage device 100 and the voltage to be applied to the MCU 101, the VCM driver 102, and the SPM driver 103 are measured. According to the measurement results, an optimum current-amount limiting value not exceeding the rated current of the SPM driver 103 is calculated. The current to be applied to the SPM driver 103 and the SPM 109 is changed so that the current does not exceed this optimum current-amount limiting value.

Conventionally, the storage device 100 is activated irrespectively of the temperature in the disk enclosure unit of the storage device 100. However, when a back-electromotive force occurring due to a stop of rotation at power cutoff is applied to the spindle-motor control IC (SPM driver 103), the back-electromotive force may exceed the maximum rating depending on temperature condition. To get around this, the SPM 109 is prevented from being activated at a temperature at which a back-electromotive force exceeding the maximum rating of the spindle-motor control IC flows. With this, it is possible to protect the circuitry of the spindle-motor control IC.

With this, it is possible to protect the circuitry of the SPM driver 103 so that the current does not exceed the rated current of the SPM driver 103, and also to start the rotation of the SPM 109 more quickly by letting a maximum allowable current flow through the SPM 109.

Next, a second embodiment is explained with reference to FIG. 7. In comparison with the first embodiment, the second embodiment is different only in the spindle-motor activating process, and other components and processes are identical to those in the first embodiment. Therefore, the identical portions are not explained herein.

Figure 7:
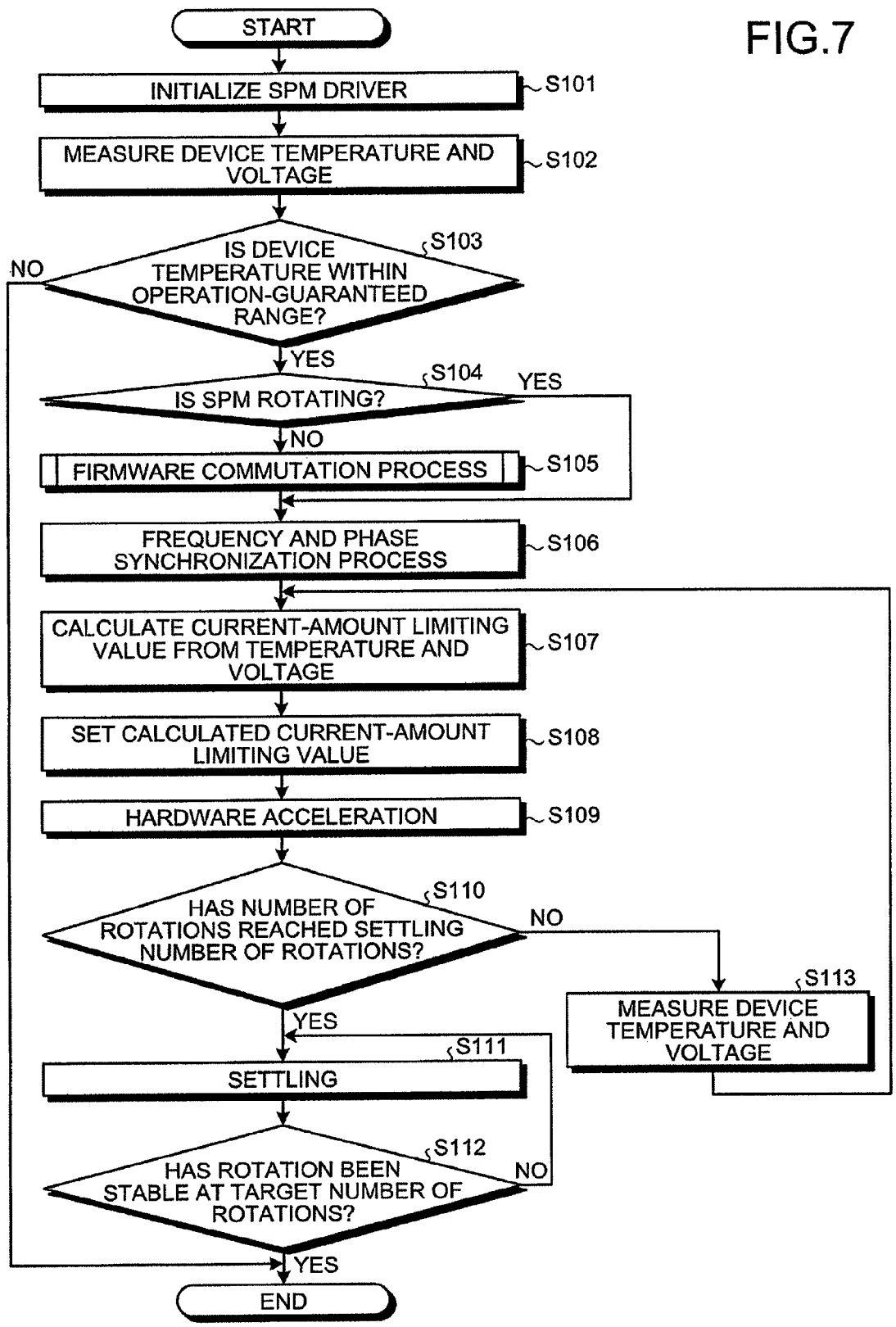
FIG. 7 is a flowchart of a spindle-motor activating procedure according to a second embodiment.

FIG. 7 is a flowchart of a spindle-motor activating procedure according to the second embodiment. In the spindle-motor activating procedure according to the second embodiment depicted in the drawing is different from the spindle-motor activating procedure according to the first embodiment in that, when the determination at step S110 is negative, the procedure goes to not step S109 but step S113.

At step S113, the voltage and temperature monitoring unit 101a measures the latest temperature in the disk enclosure unit of the storage device 100 and the latest voltage to be applied by the power supplying unit 104 to the MCU 101, the VCM driver 102, and the SPM driver 103. Upon completion of step S113, the procedure returns to step S107.

In this manner, the latest temperature and the latest voltage are continuously measured until the rotation of the SPM 109 reaches the settling number of rotations. Based on these latest temperature and voltage, the current-amount limiting value is recalculated, thereby causing the current-amount limiting value to follow the change in temperature and voltage. Based on the always optimum current-amount limiting value, the current is applied to the SPM driver 103 and the SPM 109. With this, it is possible to protect the circuitry so that the current does not exceed the rated current of the SPM driver 103 and start the rotation of the SPM 109 more quickly.

In the foregoing, while the embodiments of the present invention have been explained, the present invention is not meant to be restricted to these, and can be implemented with further various different embodiments within the range of the technical idea explained in the claims. Also, the effects explained in the embodiments are not meant to be restrictive.

Also, among the processes explained in the embodiments, all or part of processes explained as being automatically performed can be manually performed, or all or part of processes explained as being manually performed can be automatically performed with any known method. In addition, the process and control procedures, specific names, and the information including various data and parameters can be arbitrarily changed unless otherwise specified.

Furthermore, each component of each device depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

Still further, all or arbitrary part of the process function performed in each component can be achieved by a Central Processing Unit (CPU) (or a microcomputer, such as Micro Processing Unit (MPU) or MCU) and a program analyzed and executed on that CPU (or microcomputer, such as MPU or MCU), or can be achieved as hardware with a wired logic.

Regarding embodiments including the first and second embodiments explained above, the following notes are further disclosed.

According to an embodiment of the present invention, the current amount to be applied to the spindle motor is controlled so that the current amount does not exceed the current-amount limiting value for limiting the current amount to be applied to the spindle motor calculated based on the measured temperature and the measured power supply voltage. Therefore, the current-amount limiting value can be changed according to the temperature and the power supply voltage, and a larger current can be applied to the spindle motor. With this, effects can be achieved such that the storage device can be activated more quickly and, by extension, the capability of access to the storage device of the computer device in which the storage device is incorporated or to which the storage device is connected, thereby increasing the throughput of the entire computer device.

Also, according to an embodiment of the present invention, the current-amount limiting value is calculated through a simple arithmetic operation based on the difference between the measured temperature and the predetermined reference temperature, the difference between the measured power supply voltage and the predetermined reference power supply voltage, the ratio between the measured temperature and the predetermined reference temperature, or the ratio between the measured power supply voltage and the predetermined reference power supply voltage. With this, an effect can be achieved such that a variable current-amount limiting value can be calculated with a low process load.

Furthermore, according to an embodiment of the present invention, frequency phase synchronization is performed after a current of the designated current amount value based on the temperature measured by the temperature measuring unit is applied to the spindle motor to activate the spindle motor. With this, an effect can be achieved such that frequency phase synchronization can be easily performed at the stage of a small number of rotations of the spindle motor. Also, the current-amount limiting value is calculated after phase synchronization of phase frequency and before acceleration of the spindle motor, and the current amount to be applied to the spindle motor is controlled so as not to exceed this current-amount limiting value. With this, an effect can be achieved such that the spindle motor can be activated and accelerated more efficiently.

Still further, according to an embodiment of the present invention, the current-amount limiting value is recalculated based on the latest temperature and the latest power supply voltage measured until it is determined that the rotation of the spindle motor reaches a steady state, and the current amount to be applied to the spindle motor is controlled so as not to exceed the recalculated current-amount limiting value to accelerate the rotation of the spindle motor. With this, an effect can be achieved such that, with the rotation of the spindle motor following a change in temperature and power supply voltage during acceleration, the spindle motor can be more efficiently accelerated.

Still further, according to an embodiment of the present invention, the designated current amount value is calculated through a simple arithmetic operation based on the difference between the measured temperature and the predetermined reference temperature or the ratio between the measured temperature and the predetermined reference temperature. With this, a variable designated current amount value can be calculated with a low process load.

Still further, according to an embodiment of the present invention, when the measured temperature is equal to or higher than the predetermined temperature, a current is prevented from flowing through the spindle motor. With this, the spindle motor and the circuitry of the applied-current-amount controlling unit can be protected.

Still further, according to an embodiment of the present invention, when the moment of inertia of the storage medium is larger than the output torque of the spindle motor with the current amount applied by controlling so that the current amount does not exceed a constant predetermined current-amount limiting value independent of the measured temperature, the current amount to be applied to the spindle motor is controlled so as not to exceed a current-amount limiting value that is calculated by the current-amount limiting value calculating unit and depends on the measured temperature. With this, effects can be achieved such that the output torque of the spindle motor can be increased and the spindle motor can be activated and accelerated to cause the rotation of the storage medium to be quickly shifted to a steady state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device comprising:
    a spindle motor configured to rotate a storage medium according to a current to be applied;
    a head configured to locate over the storage medium;
    a temperature measuring unit configured to measure a temperature;
    a voltage measuring unit configured to measure a voltage supplied to the spindle motor;
    a current limit value calculating unit configured to calculate a current limit value which relates to a maximum value of the current based on the temperature and the voltage; and
    an applied-current controlling unit configured to control the current so that the current which does not exceed the current limit value is applied to the spindle motor.

2. The storage device according to claim 1, wherein the current limit value calculating unit is configured to calculate the current limit value based on a difference between the temperature and a predetermined reference temperature.

3. The storage device according to claim 1, wherein the current limit value calculating unit is configured to calculate the current limit value based on a difference between the voltage and a predetermined reference voltage.

4. The storage device according to claim 1, wherein the current limit value calculating unit is configured to calculate the current limit value based on a ratio between the temperature and a predetermined reference temperature.

5. The storage device according to claim 1, wherein the current limit value calculating unit is configured to calculate the current limit value based on a ratio between the voltage and a predetermined reference voltage.

6. The storage device according to claim 1, further comprising:
    a designated-current value calculating unit configured to calculate a designated current value to be applied to the spindle motor to activate the spindle motor based on the temperature; and
    a frequency-phase synchronizing unit configured to perform synchronization on a phase and a frequency of the rotation of the spindle motor, wherein
    the applied-current controlling unit is configured to cause a current of the designated current value,
    the frequency-phase synchronizing unit is configured to perform synchronization on the phase and the frequency of the rotation of the spindle motor after the current of the designated current value,
    the current limit value calculating unit is configured to calculate the current limit value after the phase synchronization of the frequency phase is performed by the frequency-phase synchronizing unit, and
    the applied-current controlling unit is configured to control the current so that the current does not exceed the current limit value to accelerate the rotation of the spindle motor.

7. The storage device according to claim 6, wherein the designated-current value calculating unit is configured to calculate the designated current value based on a difference between the temperature and a predetermined reference temperature.

8. The storage device according to claim 6, wherein the designated-current value calculating unit is configured to calculate the designated current value based on a ratio between the temperature and a predetermined reference temperature.

9. The storage device according to claim 1, further comprising a steady-state determining unit configured to determine whether the rotation of the spindle motor has been in a steady state after the current is caused by the applied-current controlling unit to be applied to accelerate the rotation of the spindle motor, wherein until it is determined that the rotation of the spindle motor has been in a steady state, the temperature measuring unit is configured to measure a latest temperature in the storage device, the voltage measuring unit is configured to measure a latest voltage supplied to the spindle motor, and the current limit value calculating unit is configured to recalculate the current limit value based on the latest temperature and the latest voltage, and the applied-current controlling unit is configured to control the current so that the current does not exceed the current limit value recalculated by the current limit value calculating unit to accelerate the rotation of the spindle motor.

10. The storage device according to claim 1, further comprising a temperature determining unit configured to determine whether the temperature is equal to or higher than a predetermined temperature, wherein when the temperature is equal to or higher than the predetermined temperature, the applied-current controlling unit is configured to prevent a current from being applied to the spindle motor.

11. The storage device according to claim 1, wherein
a driving force required for a rotation of the storage medium based on a moment of inertia is larger than an output torque of the spindle motor with a current applied by controlling so that the current does not exceed a constant predetermined current limit value independent of the temperature.

12. A method for controlling a storage device comprising a spindle motor configured to rotate a storage medium according to a current to be applied, and a head configured to locate over the storage medium, the method comprising:
measuring a temperature;
measuring a voltage supplied to the spindle motor;
calculating a current limit value which relates to a maximum value of the current based on the measured temperature and the measured voltage; and
controlling the current so that the current which does not exceed the current limit value is applied to the spindle motor.

* * * * *